US005333377A

United States Patent [19]

Phillips

[11] Patent Number: 5,333,377

[45] Date of Patent: Aug. 2, 1994

[54] CHANGE GEAR APPARATUS AND METHOD

[75] Inventor: Allyn E. Phillips, Simpsonville, S.C.

[73] Assignee: Reliance Electric Industrial Company, Greenville, S.C.

[21] Appl. No.: 66,889

[22] Filed: May 25, 1993

[51] Int. Cl.[5] .............................................. B23P 19/04

[52] U.S. Cl. ...................................... 29/893.2; 29/252; 29/525; 29/893.1; 29/898.07

[58] Field of Search ................. 29/244, 252, 264, 525, 29/893.1, 893.2, 898.07

[56] References Cited

U.S. PATENT DOCUMENTS

| | | | |
|---|---|---|---|
| 2,721,377 | 10/1955 | Hedlund | 29/264 |
| 3,242,669 | 3/1966 | Henley | 29/252 X |
| 3,333,320 | 8/1967 | Black | 29/252 |
| 3,742,568 | 7/1973 | Hahlbeck | 29/252 X |
| 4,472,869 | 9/1984 | Yasui et al. | 29/252 X |
| 4,592,124 | 6/1986 | Keith | 29/264 |
| 4,610,066 | 9/1986 | Cline | 29/252 |
| 4,776,078 | 10/1988 | Howard et al. | 29/252 |

*Primary Examiner*—Mark Rosenbaum
*Assistant Examiner*—S. Thomas Hughes
*Attorney, Agent, or Firm*—Dority & Manning

[57] ABSTRACT

A method and apparatus for pressing a gear or the like onto a shaft. A pressing actuator has a fixed portion and a movable actuator rod and a pressing sleeve connected to the actuator rod for engaging a face of the gear. The actuator rod moves through and is concentric with the pressing sleeve. Actuator rod adapter and shaft adapter attach the shaft to the actuator rod. When the actuator rod is retracted within the actuator body, the shaft is pulled through a shaft bore in the gear by the actuator rod, the actuator rod adapter, and the shaft adapter while the gear is held stationary with respect to the actuator fixed portion by the pressing sleeve, thus pressing the gear onto the shaft.

24 Claims, 3 Drawing Sheets

CHANGE GEAR APPARATUS AND METHOD

BACKGROUND OF THE INVENTION

Mechanical gear reducers and increasers are commonly used in industry to provide for proper shaft speed reduction or increase between a prime mover such as an electric motor or other drive means and a conveyer or other output systems. Mechanical reducers provide for increased output torque by mechanically reducing the speed of the driving motor. Conversely, mechanical increasers provide for increased output speed by mechanically increasing the speed of the driving motor. For convenience herein, speed reducer will be referred to, but it should be understood that the principles of the present invention are equally applicable to increasers as well as other systems where it is desirable to mount a gear or the like onto a shaft.

The speed reducer may be driven by a prime mover through a belt drive, direct connection or the like and a multitude of reduction ratios may be utilized. The reducer provides output power to conveyors or the like in a variety of industries including, but not limited to, sand and gravel operations, food processing, feed and grain operations, chemical processing, mining, shipping, or aggregate conveyer systems.

Speed reducers are designed with a varying housing size depending upon end use and application and each housing size may be designed with a multitude of gear ratios. Thus, in order to cover the entire product range a large number of parts are required. Since asset management of speed reducer manufacturers and distributors discourages them from carrying an inventory of completely assembled reducers in every ratio and in sufficient quantity for each ratio, it is desirable to have a means to make an inventory of gear reducers more flexible to customer needs.

One system to create flexible inventory is to design the product with common output gear sets and vary the total ratio by changing the ratio in the input or intermediary stages. This is accomplished by using different sized change gear sets in response to the desired reduction ratio. In this method of inventory management, the issue then becomes the most suitable way to attach the change gear to the pinion shaft.

One method of attaching the change gear to the pinion shaft involves the use of a tapered gear bore fitted onto the matching taper of a pinion. The gear is retained in position on the pinion shaft by a lock nut. Although this method does achieve a flexible inventory, there are several disadvantages associated with it. First, the tapered gear bores and matching tapered pinion shafts are more difficult and costly to machine than traditional straight cylindrical bores. Second, great care must be taken to tighten the lock nut properly to achieve a proper fit of the gear bore to the shaft journal; thus, the integrity of the fit is heavily dependent upon the skills of the individual making the assembly. Furthermore, since tightening of the nut provides the interference fit of the gear to the shaft, the interference fit cannot be relied upon to transmit any of the load. Thus, a key must be designed to carry all of the load.

Another disadvantage to the tapered bore system is that the fit may appear correct at installation, however, if any debris on either the gear bore or pinion journal is present, an incorrect fit will be made, loosening over time will occur, and gear failure will result. Moreover, debris between the shaft and gear bore can cause the gear to be installed less than perfectly square to the shaft resulting in less than desirable gear performance. Thus, while cleanliness is always desirable, it is essential in the tapered bore interference fit for adequate performance.

Another common method utilizes a straight gear bore and a straight shaft. Since an interference fit is desirable for the proper functioning of the reducer, the gear is heated and then shrunk onto the shaft. There are several disadvantages associated with this method. First, special ovens are desirable to heat the gear to approximately 300 degrees Fahrenheit. Second, overheating the gear can result in damage to the gear by changing its metallurgical structure. This frequently occurs when assemblers without ovens try to heat the gear using torches or other localized methods of heating. Also, underheating of the gear may result in the gear becoming only partly assembled to the shaft while initially appearing tight. Eventually, the gear will move after the reducer is placed in service. Finally, heating and shrinking the gear onto the shaft is best done at the factory and in production lot sizes. This method does not lend itself to quick response to customer needs and inventory flexibility.

SUMMARY OF THE INVENTION

The present invention recognizes and addresses the foregoing disadvantages, and others of prior art constructions and methods.

Accordingly it is an object of the present invention to provide an improved method and apparatus of pressing a gear on a shaft.

It is another object of the present invention to provide a gear pressing apparatus and method of assembly for a mechanical reducer or the like which allows normally skilled assemblers to fit the change gear into the reducer while providing the stability associated with a heat and shrink fit.

Another object of the present invention is to provide an apparatus and method for assembling a gear onto a shaft which facilitates radial, axial and circumferential alignment of a gear with respect to the shaft before the press fit is commenced.

Another object of the present invention is to provide a gear pressing apparatus and method of assembling a gear onto a shaft of a mechanical reducer more efficiently.

These and other objects of the present invention are achieved by providing an apparatus for pressing a gear or the like onto a shaft comprising a shaft adapter member including means for attaching to a shaft and being adapted to matingly engage an actuator rod adapter. The shaft adapter member has an outside diameter dimensioned so that the gear can be loosely received thereover while still maintaining radial alignment. A pressing actuator is provided including a body portion and a movable actuator rod. Further included is a pressing sleeve, the pressing sleeve including means for attaching to the body portion of the pressing actuator, the pressing sleeve being adapted to receive the actuator rod therewithin. The apparatus also includes an actuator rod adapter member including means for attaching to the actuator rod and being dimensioned so as to be capable of being received within the pressing sleeve. The actuator rod adapter member is adapted to couple with the shaft adapter member, the actuator rod adapter member and the shaft adapter member each including a coupling portion for coupling to each other such that when a gear is received on the shaft adapter and aligned with the shaft to be pressed thereon and the actuator rod is retracted, the gear is forced onto the shaft by the pressing sleeve pressing against the face of the gear while the actuator rod coupled to the shaft through the actuator rod adapter member and the shaft adapter member is retracted within the pressing sleeve.

These and other objects are also achieved by providing an improved method of pressing a gear or the like onto a shaft including the steps of attaching a shaft adapter member to the shaft upon which the gear is to be pressed, the shaft adapter member including a portion adapted to matingly engage an actuator rod adapter. A further step is providing a pressing actuator with a body portion and a movable actuator rod, the body portion including a pressing sleeve thereon adapted to receive at least a portion of the actuator rod therewithin. The method further includes the step of attaching an actuator rod adapter member to the actuator rod, the actuator rod adapter member being adapted to couple with the shaft adapter member. The method includes the further step of placing a gear loosely onto the shaft adapter member and aligning it to be pressed onto the shaft. A further step is coupling the shaft adapter member to the actuator rod adapter member, and retracting the actuator rod so that the shaft will be pulled toward the actuator while the pressing sleeve engages a face of the gear to force the gear onto the shaft.

By way of the above arrangements, the change gear can be quickly mounted to the pinion shaft using a interference fit by a normally skilled assembler. In addition, an improved system for cold pressing gears in general onto shafts is achieved.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
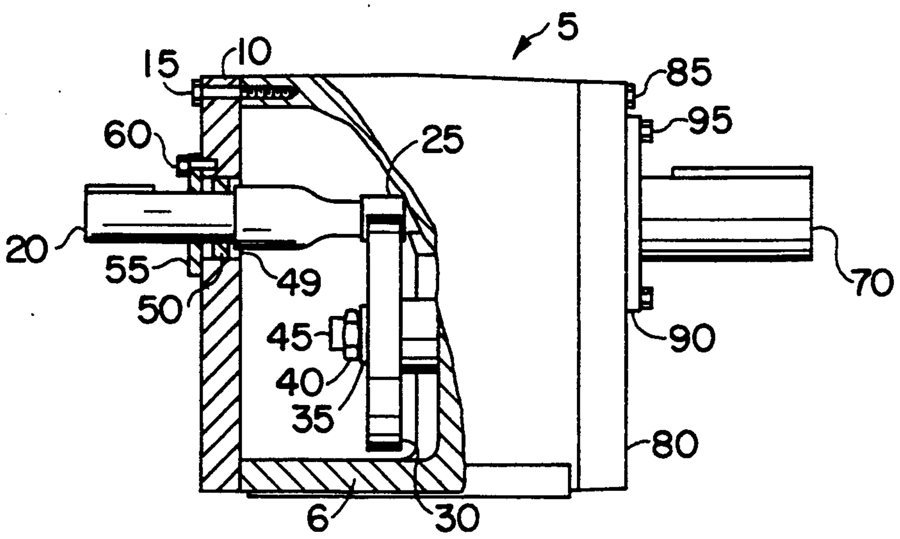
FIG. 1 illustrates a mechanical reducer in partial cutaway for which the present invention could be utilized in one embodiment.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

A mechanical speed reducer generally illustrated as 5 is shown in FIG. 1. Input cover 10 is secured to reducer housing 6 by input cover bolts 15. Input cover 10 supports input shaft 20 within bore 49 by via bearing assembly 50. Input cover 10 also supports input seal carrier 55. Input seal carrier bolts 60 secure input seal carrier 55 to input cover 10. Also illustrated in FIG. 1 is input pinion 25 secured to input shaft 20 by appropriate means. Secured to the reducer housing opposite the input cover is output cover 80 which also supports output shaft 70. Bolts 85 secure output cover 80 to housing 6. Output seal carrier 90 is secured to output cover 80 by output seal carrier bolts 95.

Of particular interest in FIG. 1 is change gear 30 mounted on shaft 45 and secured thereto by appropriate means such as washer 35 and nut 40. In the illustrated embodiment, the angular speed of output shaft 70 is reduced with respect to input shaft 20 by the total ratio of the speed reducer. The total ratio of the speed reducer is the product of the individual ratios of each gear stage. One of these stages is comprised of input pinion 25 and change gear 30. The ratio of the input stage is the ratio of the change gear 30 to the input pinion 25. To achieve optimal flexibility in inventory, output gears and pinions (not shown) are kept the same while the sizes of change gear 30 and pinion 25 are changed at distribution points to facilitate different reduction ratios. It should also be appreciated that intermediate gearing could be changed as well, and such is well within the scope of the present invention.

Figure 2:
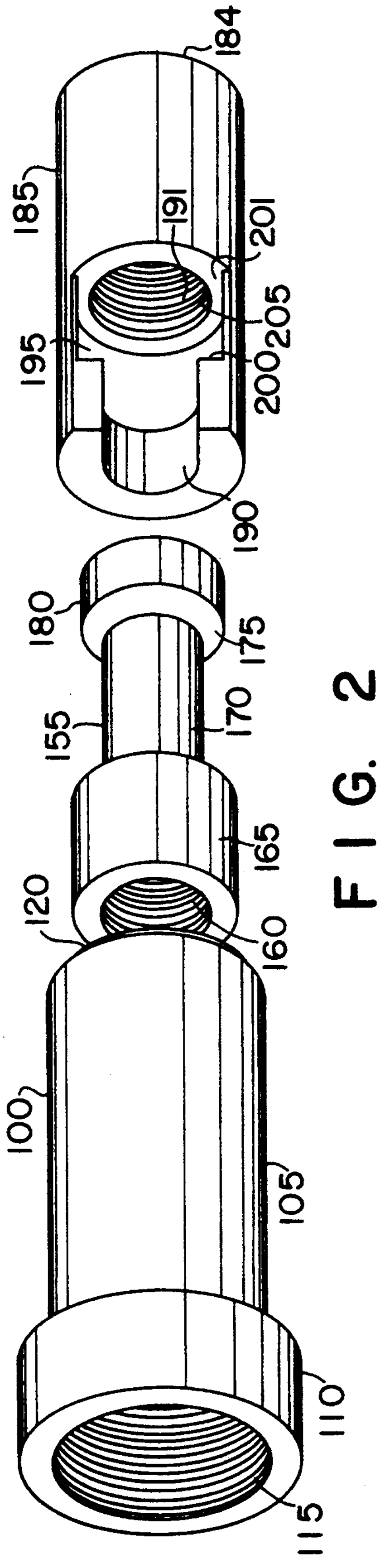
FIG. 2 is a perspective view of a pressing sleeve, an actuator rod adapter and an shaft adapter member according to an embodiment of the present invention.
Figure 3:
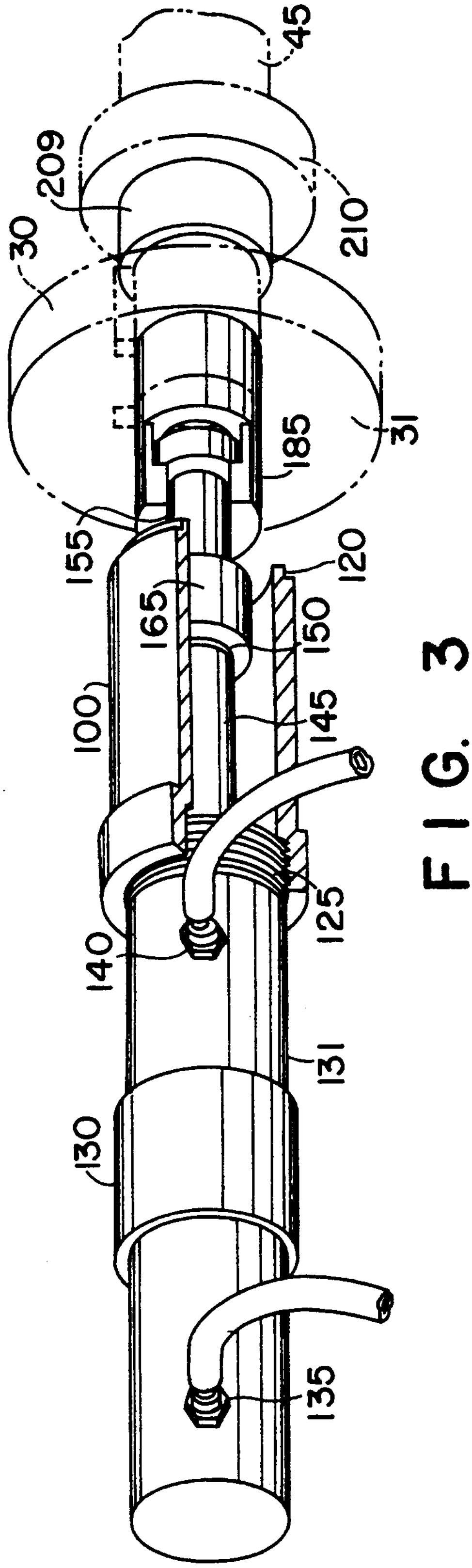
FIG. 3 is a side perspective view with parts broken away in accordance with an embodiment of the present invention.

FIGS. 2 and 3 illustrate tooling according to the present invention which provides for a quick and secure press fit of change gear 30 onto shaft 45 by a normally skilled assembler. It should be appreciated that the present description refers to change gears on a speed reducer or increaser, but the present invention has applicability to placing any type of gear or the like onto a shaft, whether in a gear reducer environment or not.

Referring to FIGS. 2 and 3, pressing sleeve 100, actuator rod adapter 155, and shaft adapter 185 are shown in a tandem coaxial arrangement. More specifically, pressing sleeve 100 has a main cylindrical sleeve body 105, a sleeve body coupling portion 110 rigidly attached at or integral with one end and an annular face 120 at the other end of the sleeve body. Within sleeve body coupling 110 are means for attaching to the actuator body 131. More specifically, in the illustrated embodiment, the means for attaching is comprised of threads 115 on an inner surface of sleeve body coupling 110. Threads 115 mate with threads 125 on actuator 130 to provide for axially rigid attachment between pressing sleeve 100 and actuator body 131 by a screw-on arrangement. While a screw thread arrangement is illustrated, it should be appreciated that any suitable type of attaching mechanism could be utilized. In operation, annular face 120 abuts change gear face 31 when actuator rod 145 is retracted into actuator body 131.

Actuator rod adapter 155 includes three main portions. Actuator rod adapter stem 170 has actuator rod coupler hub 165 disposed at one end and coupler head 180 disposed at the other end. Actuator rod adapter 155 has means for attaching to the actuator rod 145 disposed thereon for rigid attachment of actuator rod adapter 155 to the end of actuator rod 145. More specifically, actuator rod coupler hub 165 has threads 160 disposed on an inner surface thereof. Threads 160 mate with threads 150 on actuator rod 145 such that actuator rod adapter 155 can be screwed onto and rigidly attached to actuator rod 145. Disposed on the other end of actuator rod adapter stem 170 is coupler head 180. Annular surface 175 of coupler head 180 engages shaft adapter 185 during retraction of actuator rod 145. Although the outer diameters of actuator rod coupler hub 165 and coupler head 180 may be greater than that of stem 170, both are less than the inner diameter of pressing sleeve 100 so as to allow retraction of actuator rod adapter 155 within pressing sleeve 100.

Figure 4:
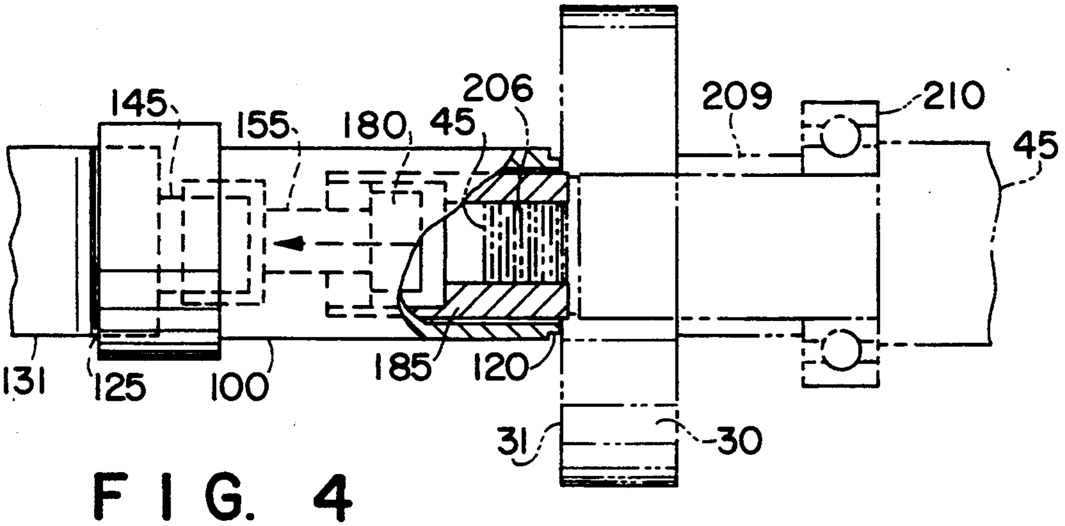
FIG. 4 is a horizontal cross-section through FIG. 3, illustrating certain components of the same and the pressing action of the pressing sleeve with respect to the change gear.

Shaft adapter 185 is also illustrated in detail in FIGS. 2 and 3. Shaft adapter 185 is generally cylindrical in shape with open slot 190 extending from one end to a midportion of shaft adapter 185. Central bore 191 extends from the opposite end 184 of adapter 185 and also terminates at a midportion therein. Both open slot 190 and central bore 191 terminate in central chamber 195. Shaft adapter 185 has means for attaching to shaft 45. More specifically, shaft adapter threads 205 are disposed on an inner surface of central bore 191. Mating threads 206 (FIG. 4) are disposed on shaft 45 so that shaft adapter 185 can be screwed onto threads 206 to provide for rigid attachment between adapter 185 and shaft 45. Central chamber 195 is further defined by end wall 200 and annular wall 201. End wall 200 is engaged by annular surface 175 during retraction of actuator rod 145 as best illustrated in FIGS. 3 and 4.

Referring more particularly to FIG. 3, the coaxial arrangement of pressing sleeve 100, actuator rod 145, actuator rod adapter 155, shaft adapter 185, spacer 209 and shaft 45 is illustrated. Thus, in use, pressing sleeve 100 is placed onto actuator body 131, shaft adapter 185 is placed onto shaft 45, and actuator rod adapter 155 is placed onto actuator rod 145. Spacer 209 is placed onto shaft 45 and abuts bearing assembly 210. Gear 30 is then loosely fitted over shaft adapter 185 until it abuts the shaft 45. As explained in more detail below, the gear bore is chamfered and the shaft is relieved to aid in alignment prior to pressing.

When actuator rod 145 is extended, head 180 is placed into central chamber 195. Since the width of open slot 190 is greater than the diameter of stem 170, stem 170 can freely slide into open slot 190 laterally and can be retracted axially by actuator rod 145 to bring annular surface 175 into engagement with end wall 200. Upon further retraction of actuator rod 145, annular surface 120 comes into contact with gear face 31 of change gear 30. Further retraction of actuator rod 145 provides the force to press change gear 30 onto shaft 45 since change gear 30 is held stationary by pressing sleeve 100 when shaft 45, shaft adapter 185, rod adapter 155 and actuator rod 145 are retracted as illustrated in greater detail in FIG. 4.

In a preferred embodiment, actuator 130 may be a hydraulic pressure cylinder. As illustrated in FIG. 3, first and second oil inlets 135 and 140 are provided for extension and retraction, respectively, of actuator rod 145 when high pressure hydraulic fluid is supplied. If high pressure fluid is supplied to 135 for extension, low pressure fluid exits from 140 and vice versa. Change gear 30 abuts shaft spacer 209 at completion of the pressing of the gear onto the shaft. As also seen in FIG. 3, bearing 210 rotatably supports shaft 45. While the preferred embodiment utilizes a hydraulic cylinder for the actuator, it should be appreciated that any suitable actuator could be used, such as, for example, a pneumatic cylinder or other type of linear actuator.

Referring to FIG. 4, it can be seen that surface 120 engages gear face 31 to press gear 30 onto shaft 45 or to draw shaft 45 through the bore of gear 30 to achieve the interference fit. Also illustrated is the coaxial arrangement of adapters 155 and 185 within the pressing sleeve 100.

Figure 6:
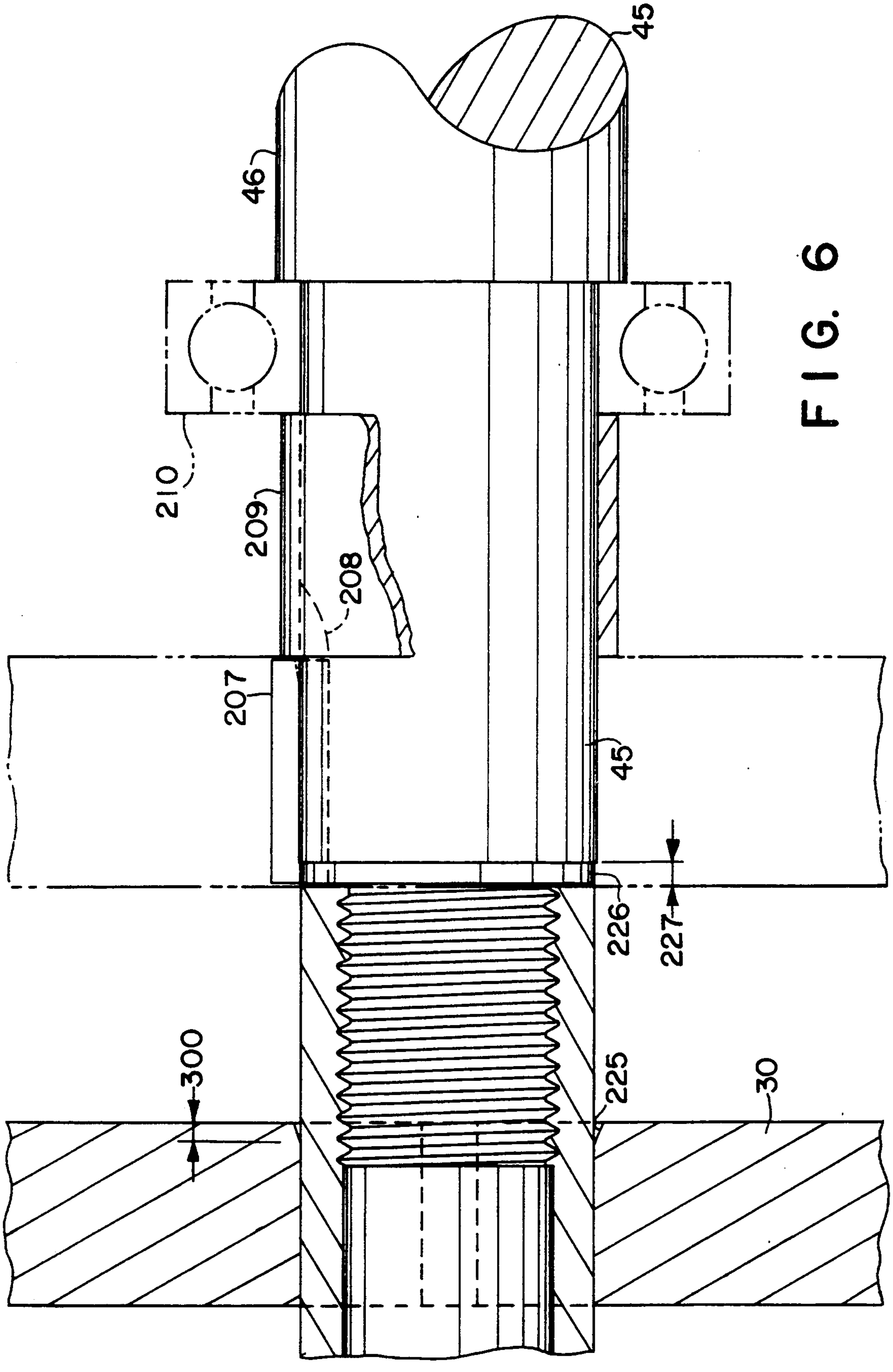
FIG. 6 is a side view of the pinion and gear illustrating a chamfer on the change gear bore and shaft end as well as other aspects of the present invention.

FIG. 6 illustrates in more detail means to facilitate alignment of change gear 30 with respect to shaft 45 prior to the actuation of pressing force. Gear 30 has a taper or chamfer 225 machined thereon extending a distance 300 that may be, for example, approximately one eighth of an inch onto the shaft at an angle of approximately 15 degrees with respect to the horizontal. Similarly, shaft 45 has a relief diameter slightly less than the minimum gear bore 226 extending a distance 227 that may be, for example, approximately one eighth of an inch back. Shaft 45 includes a shoulder 46 or other means for retaining bearing 210 in place. A spacer element 209 is located on shaft 45 between bearing 210 and gear 30. It should be appreciated that spacer element 209 could be a shoulder machined onto shaft 45. Shaft 45 includes a key slot 208 and gear 30 includes a key slot (not illustrated). A key 207 may be provided for receipt in key slot 208 and extending from adjacent an end of spacer 209 to just short of the end of shaft 45. As illustrated in FIG. 6, the key 207 extends into the chamfered area 226 on shaft 45. In use, gear 30 may be loosely placed on shaft adapter 185 and abutted against the relieved end of shaft 45. The gear 30 can then be maneuvered by hand with the taper or chamfer on the shaft and gear in engagement until the key slots on the gear and shaft become aligned. At this point, since the key extends into the relieved area on the shaft, the gear will drop or socket into place and can thereafter be pressed onto the shaft without danger of misalignment. This arrangement allows rotational alignment of key 207 with the key slot (not shown) in the gear 30 to prevent key shear due to misalignment during pressing.

Figure 5:
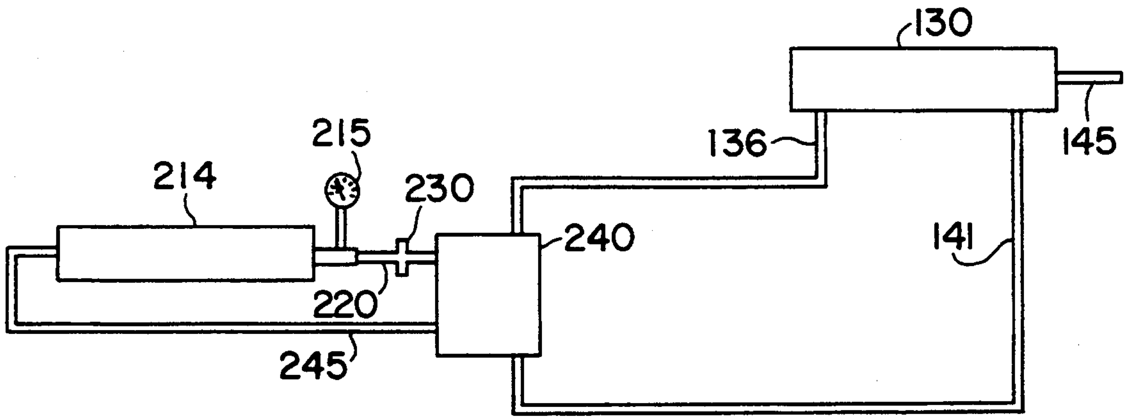
FIG. 5 is a schematic view of the actuator in accordance with one embodiment of the present invention.

FIG. 5 illustrates the overall hydraulic system in accordance with an embodiment of the present invention where the actuator is a hydraulic cylinder 130. Pump and reservoir 214 supply high pressure fluid via high pressure line 220, through connector 230 to four-way directional control valve 240. Four-way directional control valve 240 allows high pressure fluid to be fed to either one of lines 136 or 141 to effect extension or retraction of cylinder rod 145, respectively. While one feed line supplies high pressure fluid to the cylinder, the other returns low pressure fluid back through valve 240 along return line 245 to pump and reservoir 214. Pressure gauge 215 may be utilized to monitor the high pressure.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. An apparatus for pressing a gear onto a shaft, said apparatus comprising:

a) a shaft adapter member, said shaft adapter member including means for attaching said shaft adapter member to said shaft and being adapted to matingly engage an actuator rod adapter, said shaft adapter member having an outside diameter dimensioned so that said gear can be loosely received thereover;

b) a pressing actuator, said pressing actuator including a body portion and a movable actuator rod;

c) a pressing sleeve, said pressing sleeve including means for attaching said pressing sleeve to the body portion of said pressing actuator, said pressing sleeve being adapted to receive said actuator rod therewithin; and d) an actuator rod adapter member, said actuator rod adapter member including means for attaching said actuator rod adapter member to said actuator rod and being dimensioned so as to be capable of being received within said pressing sleeve, said actuator rod adapter member being adapted to couple with said shaft adapter member, wherein said actuator rod adapter member and said shaft adapter member each including a coupling portion for coupling to each other such that when a gear is received on said shaft adapter member and aligned with said shaft to be pressed thereon and said actuator rod is retracted, said gear is forced onto said shaft by said pressing sleeve pressing against a face of said gear while the actuator rod coupled to the shaft through the actuator rod adapter member and the shaft adapter member is retracted within said pressing sleeve.

2. The apparatus of claim 1 wherein said means for attaching said pressing sleeve to the body portion of said pressing actuator comprises threads that mate with threads on an outer surface of the body portion of said pressing actuator such that said pressing sleeve can be attached to said body portion to provide for rigid attachment between said body portion and said pressing sleeve.

3. The apparatus of claim 1 wherein said pressing sleeve comprises:

a cylindrical sleeve body, said sleeve body having threads disposed on an inner surface thereof at one end for attachment to said pressing actuator and an annular pressing surface on an opposite end of said cylindrical sleeve wherein said annular pressing surface engages a face of said gear while said shaft is drawn by the pressing actuator through a bore defined by said gear.

4. The apparatus of claim 1 wherein said shaft adapter member is substantially cylindrical in shape, having first and second opposite ends and further comprises:

an open slot extending from said first end of said shaft adapter member adjacent said actuator rod adapter, member along a longitudinal axis of said shaft adapter member to a midportion thereof;

a central bore extending from said second end of said shaft adapter member to said midportion thereof;

an open center chamber disposed at said midportion of said shaft adapter member such that said open slot and said central bore terminate therein, wherein a width of said open central chamber is greater than a width of said open slot and greater than a diameter of said central bore;

said central chamber further defined by a first end wall and a second end wall adjacent to a terminal end of said open slot and said central bore, respectively, such that said actuator rod adapter member engages said first end wall of said shaft adapter member to draw said shaft through a gear bore defined by the gear.

5. The apparatus of claim 4 wherein said means for attaching said shaft adapter member to said shaft includes threads disposed on said shaft and mating threads within said central bore of said shaft adapter member such that said shaft adapter member can be screwed onto said shaft to provide for rigid attachment between said shaft and said shaft adapter member.

6. The apparatus of claim 4 wherein said actuator rod adapter member includes:

a cylindrical stem portion having first and second opposite ends and a diameter less than said open slot;

a cylindrical hub portion disposed at said first end of said cylindrical stem portion, said hub portion defining said attachment means for attaching said actuator rod adapter member to said actuator rod;

a cylindrical coupler head disposed at said second end of said cylindrical stem portion, wherein respective longitudinal axes of said stem portion, said hub portion, and said coupler head are parallel and coaxial, said coupler head having a diameter greater than a width of said open slot of said shaft adapter member, said coupler head further having an annular head surface adjacent said cylindrical stem portion such that when said stem portion is transversely placed into said open slot and upon retraction of said actuator rod, said annular head surface engages said first end wall of said central chamber of said shaft adapter member to draw said shaft through said gear bore.

7. The apparatus of claim 6 wherein said attachment means for attaching the actuator rod adapter member to the actuator rod comprises threads disposed on an inner surface of said hub portion of said actuator rod adapter member and threads disposed on said actuator rod such that said actuator rod adapter member may be screwed onto said actuator rod to provide for rigid attachment between said actuator rod and said actuator rod adapter member.

8. The apparatus of claim 1 wherein an end portion of said shaft includes a relief thereon and a portion of a gear bore defined by said gear also includes a relief to facilitate alignment of said gear with respect to said shaft.

9. The apparatus of claim 1 wherein said pressing actuator is a hydraulic pressure cylinder.

10. The apparatus of claim 8 wherein said shaft and said gear bore define a shaft keyway and a gear bore keyway, respectively, and further including a spacer element located between said gear and a bearing supporting said shaft, and wherein a key may be placed in said shaft keyway abutting said spacer element and will extend to an end of said shaft keyway so that when said gear received on said shaft adapter member is rotated prior to pressing, the gear will move slightly onto the shaft over the relief when the key is aligned with the gear bore keyway to assure proper alignment during pressing.

11. A method of pressing a gear onto a shaft including the steps of:

a) attaching a shaft adapter member to the shaft upon which the gear is to be pressed, said shaft adapter member including a portion adapted to matingly engage an actuator rod adapter and being dimensioned so that a gear can be loosely received thereover;

b) providing a pressing actuator with a body portion and a movable actuator rod, said body portion including a pressing sleeve thereon adapted to receive at least a portion of said actuator rod therewithin;

c) attaching said actuator rod adapter member to said actuator rod, said actuator rod adapter member being adapted to couple with said shaft adapter member;

d) loosely placing said gear to be pressed onto the shaft adapter member and positioning said gear with the shaft adjacent a gear bore defined by said gear;

e) coupling said shaft adapter member to said actuator rod adapter member; and f) forcing said gear onto the shaft by pulling said shaft toward said actuator by a retraction of said actuator rod while said pressing sleeve engages a face of said gear.

12. The method of claim 11 wherein the method includes utilizing a pressure cylinder as the pressing actuator.

13. The method of claim 11 further including utilizing a shaft and gear with keyways therein and the further step of aligning the keyways prior to pressing.

14. An apparatus for pressing a gear onto a shaft, said apparatus comprising:

a) a shaft adapter member, said shaft adapter member including means for attaching said shaft adapter member to said shaft and being adapted to matingly engage an actuator rod adapter, said shaft adapter member having an outside diameter dimensioned so that said gear can be loosely received thereover;

b) a pressing sleeve, said pressing sleeve including means for attaching said pressing sleeve to a body portion of a pressing actuator and being adapted to receive an actuator rod of said pressing actuator therein;

c) an actuator rod adapter member, said actuator rod adapter member including means for attaching said actuator rod adapter member to the actuator rod and being dimensioned so as to be capable of being received within said pressing sleeve, said actuator rod adapter member being adapted to couple with said shaft adapter member, said actuator rod adapter member and said shaft adapter member each including a coupling portion for coupling to each other such that when the gear is received on said shaft adapter member and aligned with the shaft to be pressed thereon, and the actuator rod adapter member is attached to an actuator rod and the shaft adapter member is attached to the shaft and the pressing sleeve is attached to a fixed portion of the pressing actuator, and the actuator rod is retracted, the gear is forced onto the shaft by the pressing sleeve pressing against a face of the gear.

15. The apparatus of claim 14 wherein said means for attaching said pressing sleeve to the body portion of a pressing actuator comprises threads that mate with threads on an outer surface of the body portion of the pressing actuator such that the pressing sleeve can be attached to the body portion to provide for rigid attachment between the body portion and the pressing sleeve.

16. The apparatus of claim 14 wherein the pressing sleeve comprises:

a cylindrical sleeve body, the sleeve body having threads disposed on an inner surface thereof at one end for attachment to the body portion of the pressing actuator, and an annular pressing surface on an opposite end of said cylindrical sleeve body, wherein said annular pressing surface engages a face of said gear while said shaft is drawn by the pressing actuator through a gear bore defined by the gear.

17. The apparatus of claim 14 wherein said shaft adapter member is substantially cylindrical in shape having first and second opposite ends and further comprises:

an open slot extending from said first end of said shaft adapter member adjacent said actuator rod adapter, member along a longitudinal axis of said shaft adapter member to a midportion thereof;

a central bore extending from said second end of said shaft adapter member to said midportion thereof;

an open center chamber disposed at said midportion of said shaft adapter member such that said open slot and said central bore terminate therein, wherein a width of said open central chamber is greater than a width of said open slot;

said central chamber further defined by a first end wall and a second end wall adjacent to a terminal end of said open slot and said central bore, respectively, such that said actuator rod adapter member engages said first annular wall of said shaft adapter member engages said first annular wall of said shaft adapter member to draw said shaft through a gear bore defined by the gear.

18. The apparatus of claim 17 wherein said means for attaching said shaft adapter member to said shaft includes threads disposed on said shaft and mating threads within said central bore of said shaft adapter member such that said shaft adapter member can be screwed onto said shaft to provide for rigid attachment between said shaft and said shaft adapter member.

19. The apparatus of claim 17 wherein said actuator rod adapter member includes a cylindrical stem portion having first and second opposite ends and a diameter less than said open slot;

a cylindrical hub portion disposed at said first end of said cylindrical stem portion, said hub portion defining said attachment means for attaching said actuator rod adapter member to the actuator rod;

a cylindrical coupler head disposed at the second end of the cylindrical stem portion, wherein respective longitudinal axes of said stem portion, said hub portion and said head are parallel and coaxial, said coupler head having a diameter greater than a width of said open slot of said shaft adapter member, said coupler head further having an annular head surface adjacent said cylindrical stem portion such that when said stem portion is transversely placed into said open slot and upon retraction of the actuator rod, sand annular head surface engages said first end wall of said central chamber of said shaft adapter member to draw said shaft through said gear bore.

20. The apparatus of claim 19 wherein said attachment means for attaching the actuator rod adapter member to the actuator rod comprises threads disposed on an inner surface of said hub portion of said actuator rod adapter member and threads disposed on said actuator rod such that said actuator rod adapter member is screwed onto said actuator rod to provide for rigid attachment between said actuator rod and said actuator rod adapter member.

21. The apparatus of claim 14 wherein an end portion of said shaft defines a relief and a portion of a gear bore defined by said gear is tapered to facilitate alignment of said gear with respect to said shaft.

22. The apparatus of claim 14 and further including a pressing actuator.

23. The apparatus of claim 14 wherein said pressing actuator is a hydraulic pressure cylinder.

24. The apparatus of claim 21 wherein said shaft and said gear bore define a shaft keyway and a gear bore keyway, respectively, and further including a spacer element located between said gear and a bearing supporting said shaft, and wherein a key may be placed in said shaft keyway abutting said spacer element and will extend to an end of said shaft keyway so that when said gear received on said shaft adapter member is rotated prior to pressing, the gear will move slightly onto the shaft over the shaft relief when the key is aligned with the gear bore keyway to assure proper alignment during pressing.

* * * * *